Feb. 10, 1970   L. H. KLINE   3,494,439
CRAWLER MECHANISM
Filed Dec. 27, 1967   4 Sheets-Sheet 1

INVENTOR
LESTER H. KLINE

BY-
Yount, Flynn & Tarolli
ATTORNEYS

Feb. 10, 1970 — L. H. KLINE — 3,494,439

CRAWLER MECHANISM

Filed Dec. 27, 1967 — 4 Sheets-Sheet 3

INVENTOR.
LESTER H. KLINE

Feb. 10, 1970            L. H. KLINE            3,494,439

CRAWLER MECHANISM

Filed Dec. 27, 1967            4 Sheets-Sheet 4

INVENTOR
LESTER H. KLINE

BY *Yount, Flynn & Tarolli*
ATTORNEYS

൧

3,494,439
CRAWLER MECHANISM
Lester H. Kline, Dover, Ohio, assignor to The Warner & Swasey Company, Cleveland, Ohio, a corporation of Ohio
Filed Dec. 27, 1967, Ser. No. 693,911
Int. Cl. B62d 11/00, 55/00
U.S. Cl. 180—6.48                                   8 Claims

ABSTRACT OF THE DISCLOSURE

A crawler mechanism having a body mounted on spaced apart track assemblies by axles extending from the body. The track assemblies are movable relative to each other to enable the width of the crawler mechanism to be varied. Spacers are provided for use in locating the track assemblies in predetermined positions on the axles. The track assemblies are driven by hydraulic motors which are movable relative to the body with an associated track assembly. The hydraulic motors are drivingly connected to the associated track assemblies by transmissions located between upper and lower runs and within lateral confines of the associated track assemblies.

---

This invention relates generally to a crawler mechanism and more particularly to a crawler mechanism for use with ditch diggers, cranes or other excavating machines.

For purposes of stability, it is desirable to provide excavating machines with crawler mechanisms which have track assemblies spaced relatively large distances apart. However, the spacing of the track assemblies must be limited to enable the crawler mechanism to be readily transported between job sites. Therefore, it is an object of this invention to provide a new and improved crawler mechanism having track assemblies which are movable relative to each other between a relatively wide extended or working position and and a relatively narrow or traveling position.

Another object of this invention is to provide a new and improved crawler mechanism in accordance with the preceding paragraph and which has a relatively compact drive assembly including separate motors each of which is mounted for movement with an associated track assembly between the extended and retracted positions.

It is another object of this invention to provide a new and improved crawler mechanism including first and second track means driven by first and second hydraulic motors for moving the crawler mechanism relative to a support surface wherein the first and second track means are movable relative to each other to enable the spacing therebetween to be varied and wherein the first and second hydraulic motors are each mounted on an associated one of the track means for movement therewith relative to the other track means and motor when the spacing between the track means is varied.

Another object of this invention is to provide a new and improved crawler mechanism in accordance with the preceding paragraph and which further includes a transmission means associated with each of said track means for drivingly connecting the motors to the track means the transmission means being located between upper and lower runs of the track means and within lateral confines of the track means.

Another object of this invention is to provide a new and improved crawler mechanism including spacer means and first and second track means which are movable along axles between an inner position in which the first and second track means are relatively close together and an outer position in which the first and second track means are relatively far apart, and wherein the spacer means may be located on the axles and associated with the first and second track means to hold the first and second track means in the outer position or may be located on the outer end portions of the axles to hold the first and second track means in the inner position.

These and other objects and features of the invention will become more apparent upon a consideration of the following detailed description taken in connection with the accompanying drawings wherein.

Figure 1:
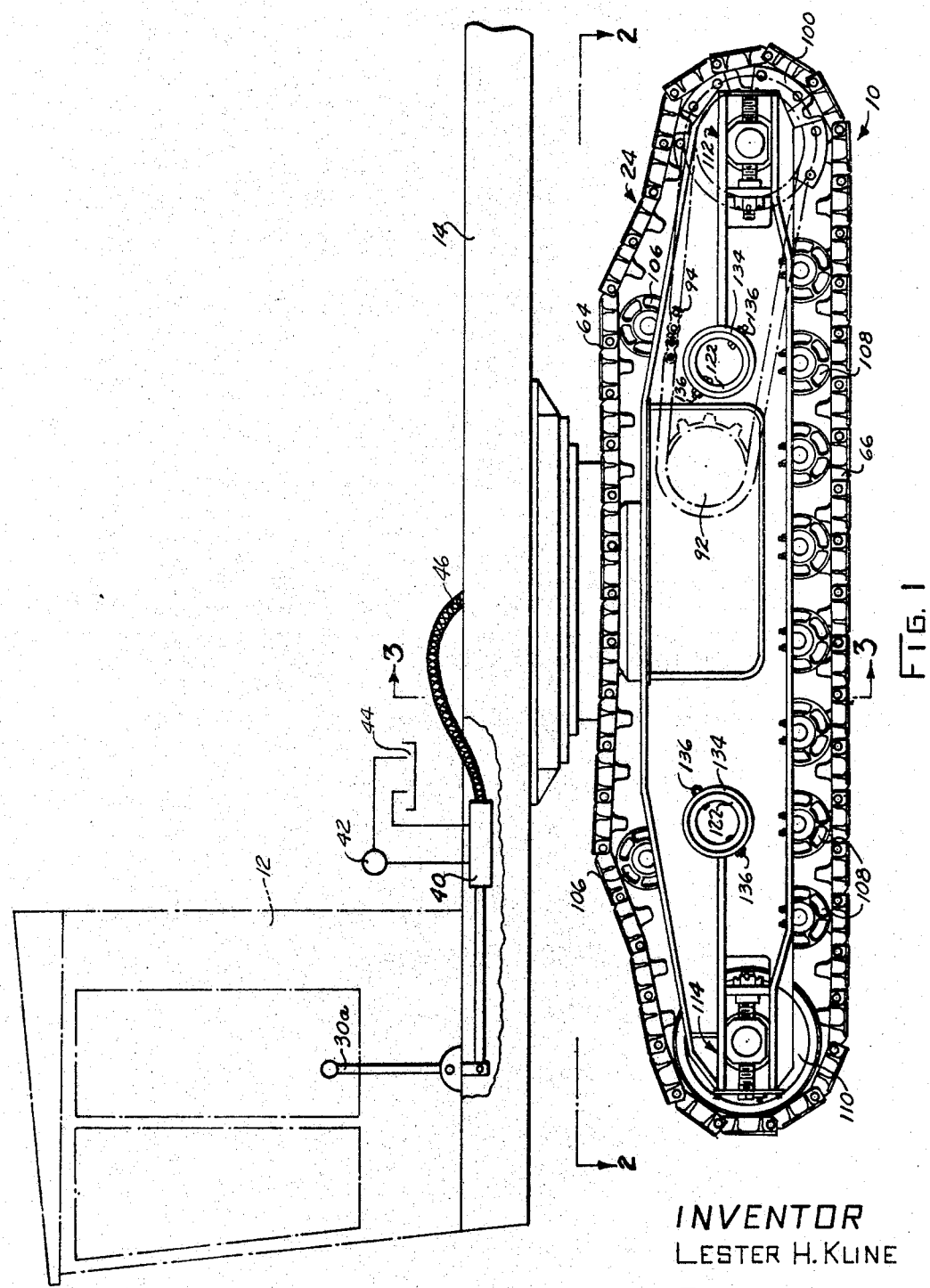
FIG. 1 is an elevational view of a crawler mechanism forming a preferred embodiment of the invention and associated with a cab of an excavating machine.

This invention provides a crawler mechanism having track assemblies which are movable between extended and retracted positions. The track assemblies are each driven by separate motors through transmissions mounted between upper and lower runs or stretches of track and located within lateral confines or limits of the associated track assembly. Although it is contemplated that crawler mechanisms constructed in accordance with the present invention will be used in many different environments, a crawler mechanism 10 forming a preferred embodiment of the invention is shown in FIG. 1 in association with cab or housing 12 and platform or deck 14 of an excavating mechanism (not shown).

The crawler mechanism 10 includes an undercarriage frame or body 18 (see FIGS. 2 and 3) mounted on left and right hand track assemblies 24 and 26 by front and rear axle assemblies 28 and 30. The cab 12 and platform 14, shown in only FIG. 1 for purposes of clarity of illustration, are rotatable relative to the body 18 of the crawler mechanism 10. This rotatability of the cab 12 and platform 14 facilitates operation of any desired excavating mechanism which may be mounted on the platform 14 in association with the crawler mechanism. Suitable controls, indicated schematically at 30a in FIG. 1, are provided in the cab 12 for regulating the operation of the crawler mechanism 10.

Separate hydraulic motors 34 and 36 are provided for driving an associated track assembly 24 or 26 in accordance with the operation of the controls 30a. The controls 30a are connected to a valve mechanism 40 which regulates the flow of fluid to the motors from a pump 42 and reservoir 44 through a conduit or hose 46. The conduit 46 is connected in fluid communication with a post assembly 50 (FIG. 3) when the platform 14 and cab 12 are mounted on the crawler mechanism 10. Manipulation of the controls 30a operates the reversible hydraulic motors 34 and 36 to turn the crawler mechanism 10 and drive the crawler mechanism forward and backward in a well known manner.

The post assembly 50 enables the platform 14 and cab 12 to be rotated relative to the crawler mechanism 10 while maintaining fluid communication between the hydraulic motors 34 and 36 and the pump 42. Accordingly, the post assembly 50 is located in a chamber 52 in the body 18 and includes a rotatable center portion 54 and a fixed outer casing or housing 56 which extends around the rotatable center portion (see FIG. 3). The hydraulic motors 34 and 36 are connected to the outer housing or casing 56 by flexible hoses or conduits 58 and 60. The hoses and conduits 58 and 60 are connected with the conduit 46 (FIG. 1) by passages formed in the post assembly 50 between the rotatable center post 54 and the fixed housing or casing 56. The means for connecting the hydraulic motors 34 and 36 with the pump 42 through the post assembly 50 is known to those skilled in the art and can within the scope of this invention take many different forms. Therefore, it is believed that a further description of this post assembly 50 is not warranted at this time.

Figure 2:
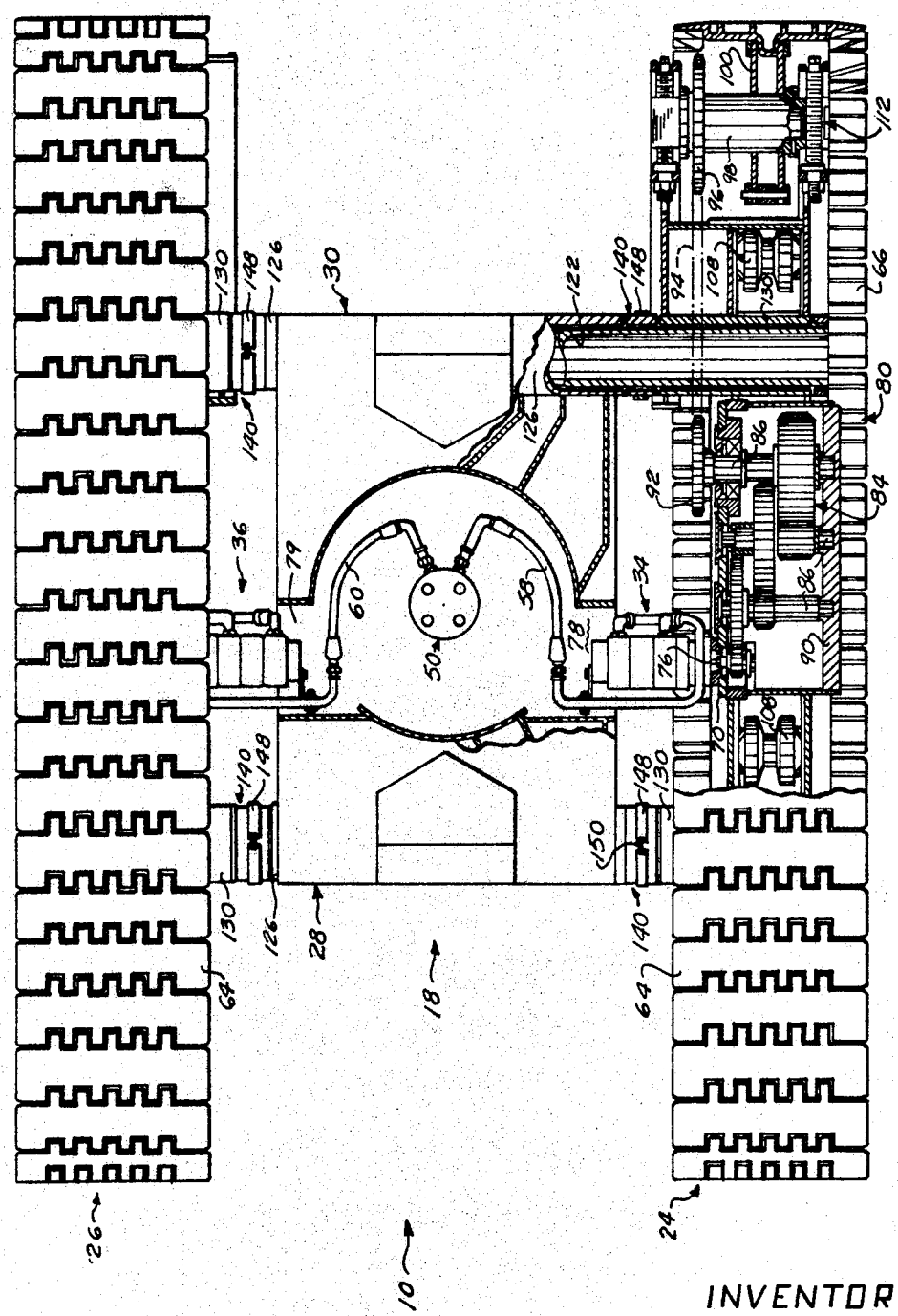
FIG. 2 is a partially broken away sectional view, taken along the line 2—2 of FIG. 1, illustrating the relationship of drive motors and a transmission to track assemblies of the crawler mechanism.
Figure 3:
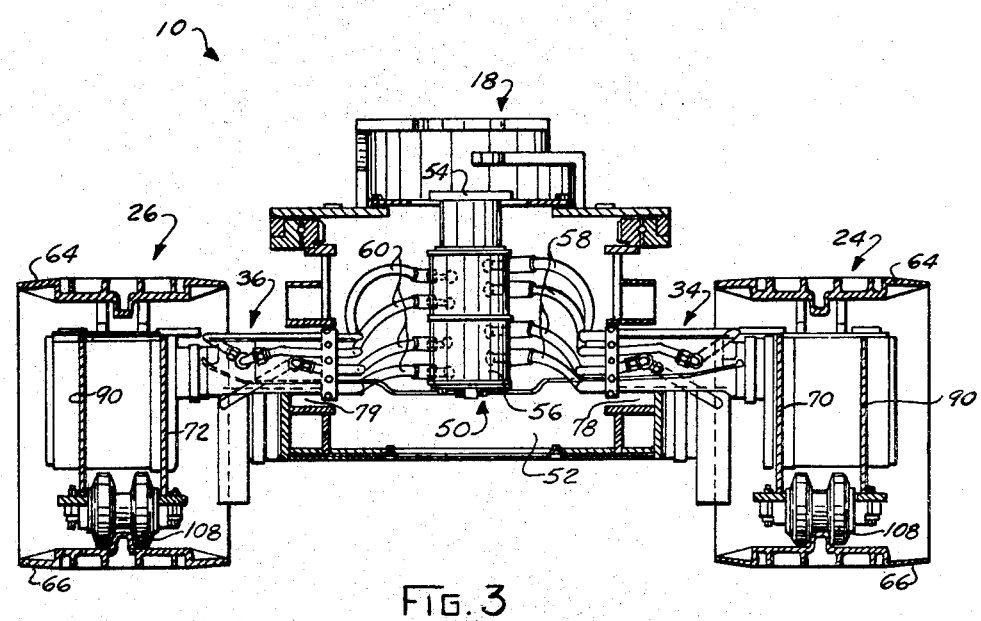
FIG. 3 is a sectional view, taken along the line 3—3 of FIG. 1 with the platform of the excavating machine omitted, further illustrating the relationship between the drive motors and track assemblies.

In order to minimize the length and complexity of a drive train for interconnecting the motors 34 and 36 and the track assemblies 24 and 26, the motors are mounted on longitudinally extending side walls 70 and 72 of the associated track assemblies 24 and 26 between upper and lower runs or stretches of track or tread 64 and 66 (see FIGS. 2 and 3). The motors 34 and 36 are mounted with their drive shafts (only the drive shaft 76 of the motor 34 being shown in FIG. 2) extending in a transverse relationship to the longitudinal axes of the track assemblies. To enable the motors 34 and 36 to be readily connected in fluid communication with the post assembly 50, the motors project outwardly past the lateral confines or side edges of the associated track assemblies 24 and 26 and into openings or passages 78 and 79 in the body 18. The passages 78 and 79 open into the chamber 52 and are of sufficient size to enable the flexible hoses 58 and 60 to be readily installed between the post assembly 50 and motors 34 and 36.

A transmission 80 drivingly interconnects the motor 34 and track assembly 24 to drive the track assembly and thereby move the crawler mechanism relative to a support surface (see FIG. 2). Accordingly, the transmission 80 includes a gear train 84 formed by a plurality of spur gears mounted on shafts 86 extending transversely between the side wall 70 and an outer wall 90. The gear train 84 is connected by a drive sprocket 92 and chains 94 (see FIGS. 1 and 2) to a driven sprocket 96 mounted on a shaft 98. A drive tumbler gear assembly 100 is mounted on the shaft 98 for transmitting drive forces to the treads of the track assembly in a known manner.

In accordance with the present invention, the transmission 80 is relatively compact and is located between the upper and lower runs 64 and 66 of the track assembly 24. The transmission 80 is also located within the lateral confines or edges of the track assembly 24 to protect the transmission against engagement with foreign objects. The upper and lower runs of the track assembly are supported on idler and drive rollers 106 and 108 (FIG. 1) in a well known manner for engagement with the drive tumbler gear assembly 100 and an idler tumbler gear assembly 110. Adjusting mechanisms 112 and 114 are mounted on the side walls 70 and 90 for adjusting the effective length of the track assembly 24. While the hydraulic motor 34 is shown projecting transversely outwardly of the lateral confines of the track assembly 24, it will be apparent to those skilled in the art that the motor 34 could, if desired, be mounted within the lateral confines of the track assembly by moving the motor outwardly of the position shown in FIG. 2.

While only the structure of the left hand track assembly 24 and transmission 80 has been illustrated in detail, it should be understood that the right hand track assembly 26 has generally the same construction as the left hand track assembly 24 and is associated with a transmission similar to transmission 80. Thus, the two track assemblies 24 and 26 are driven through relatively compact structures including the hydraulic motors 34 and 36 and transmissions similar to transmission 80. The transmissions are advantageously located between upper and lower runs 64 and 66 and within the lateral confines of the track assemblies 24 and 26.

Figure 4:
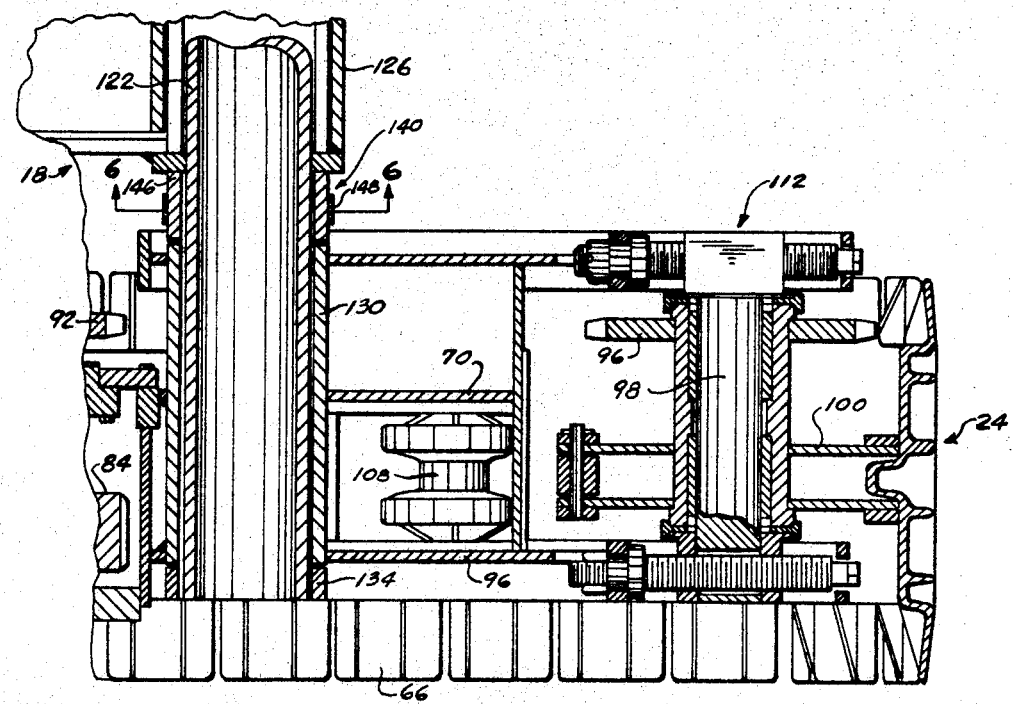
FIG. 4 is an enlarged sectional view of a portion of the crawler mechanism with the track assemblies in an extended or outer position.
Figure 5:
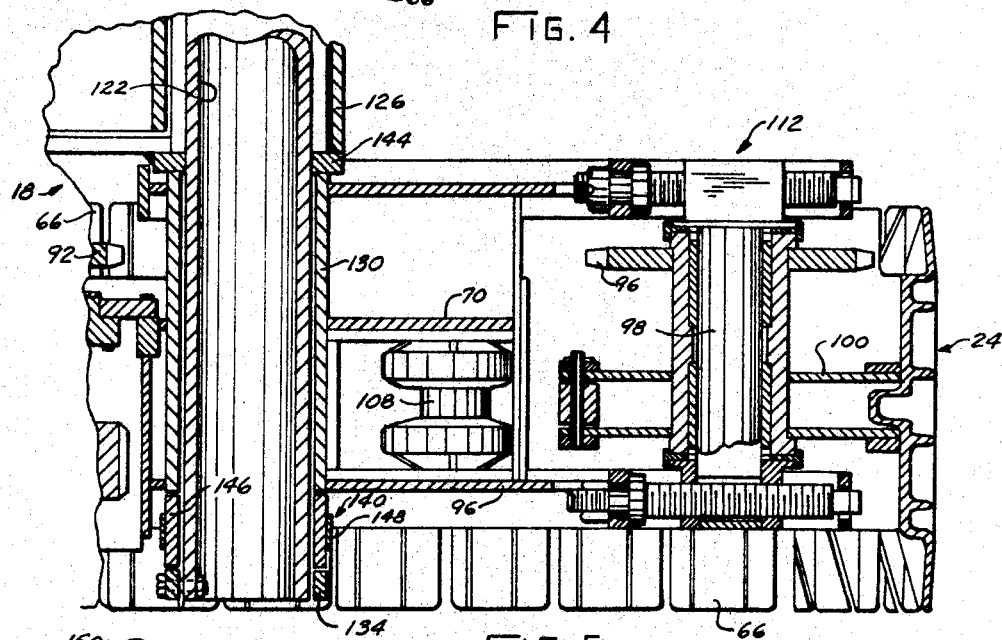
FIG. 5 is an enlarged sectional view, similar to FIG. 4, illustrating a track assembly in a retracted or inner position.

In accordance with a feature of this invention, the track assemblies 24 and 26 are movable relative to each other between a relatively wide extended or outer position (shown in FIGS. 2, 3 and 4) and a relatively narrow retracted or inner position (shown in FIG. 5). It is contemplated that the track assemblies 24 and 26 will be located in the outer position to provide a relatively large degree of stability for the crawler mechanism 10 during operation or working of an excavating mechanism (not shown) mounted on the platform 14. When the crawler mechanism 10 is to be moved to another location, it is contemplated that the track assemblies 24 and 26 will be moved inwardly to the inner position to thereby reduce the width of the crawler mechanism 10 to facilitate transportation thereof. To these ends, the axle assemblies 28 and 30 include transversely extending inner or axle tubes 122 (see FIGS. 1 and 2) upon which the track assemblies 24 and 26 are slidably mounted for movement relative to each other.

Since the axle assemblies 28 and 30 are substantially the same in structure at both end portions, only one end portion of the axle assembly 30 has been illustrated in detail in the drawings. The inner tube 122 is supportingly connected to the body 18 and is slidably received in a relatively large diameter outer body tube or housing 126 which is fixedly mounted on the body 18 and extends transversely outwardly of the body. The track assembly 24 is in turn supportingly connected to the inner tube 122 by an outer track mounting or connector tube 130 which extends between and is fixedly connected to the longitudinally extending side walls 70 and 96 of the track assembly 24 (see FIGS. 2 and 4). Thus, the body 18 of the crawler mechanism 10 is supported on the track assemblies 24 and 26 by engagement of two relatively long inner tubes, similar to the inner tube 122, which supportingly engage mounting or connector tubes 130 connected to side walls of the track assemblies.

The distance between the track assemblies 24 and 26 is varied by sliding the mounting tubes 130 axially along the inner tubes 122. This perhaps is best illustrated by a comparison of FIGS. 4 and 5. In FIG. 4, the track assembly 24 is illustrated in the outer position with the mounting tube 130 spaced from the body 18 and in abutting engagement with a tubular stop section 134 which is fixedly connected to the inner tube 122 by suitable connector, such as bolts 136 (see FIG. 1). The stop section 134 limits the outward movement of the track assembly 24 relative to the body 18 and inner tube 122. A tubular spacer assembly 140 is located between an inner end portion of the mounting tube 130 and an inner stop collar or plate 144 on the body 18 to hold the mounting tube in engagement with the outer stop 134 so that the track assembly 24 is maintained in the outer position of FIG. 4.

When the track assembly is to be moved to the inner position of FIG. 5, the spacer assembly 140 is disconnected from the inner tube 122 and the track assembly 24 and mounting tube 130 are moved axially along the tube 122 to the inner position shown in FIG. 5. The spacer assembly 140 is then connected to the inner tube 122 between the stop section 134 and an outer end portion of the mounting tube 130 to hold the track assembly 24 in the inner position. Thus, the spacer assembly 140 is positioned adjacent to the body 18 between the track assemblies 24 and 26 to hold the track assembly 24 in the outer position of FIG. 4 and is positioned outwardly of the track assembly 24 in engagement with the stop section 134 to hold the track assembly in the inner position of FIG. 5. A similar spacer assembly 140 is associated with the axle assembly 20 and track assembly 24 to hold the track assembly 24 in a parallel relationship with the track assembly 26 (see FIG. 2). Similarly, spacer assemblies 140 are associated with the track assembly 26 to hold the track assembly in either the outer or inner position.

Figure 6:
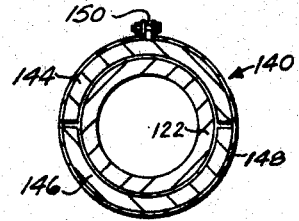
FIG. 6 is a sectional view, on a somewhat reduced scale and taken along the line of 6—6 of FIG. 4, illustrating the structure of a spacer assembly for locating the track assemblies in the inner and outer positions.

The spacer assembly 140 is advantageously formed of two sections (see FIG. 6) which are releasably interconnected to enable the spacer assembly 140 to be disconnected from the inner tube 122 and moved between the outer position shown in FIG. 4 and the inner position shown in FIG. 5 without disengaging the stop section 134 and mounting tube 130 from the inner tube 122. To this end, the spacer assembly 140 includes two semicircular sections 144 and 146 which are clamped together around the inner tube 122 by a band 148 which is releasably secured at opposite ends by a connector assembly 150. Thus, by merely loosening the connector assembly 150 the band 148 can be disengaged from the sections 144 and 146 and the sections moved between the inner and outer positions of FIGS. 4 and 5.

Movement of the track assemblies 24 and 26 between the inner and outer positions is facilitated by the previously described mounting of the motors 34 and 36 and transmissions 80 on the associated track assemblies. When the track assembly 24 is moved between the inner and outer positions, the motor 34, is moved relative to the body 28 in the passage or channel 78 (see FIGS. 2 and 3). This movement of the motor 34 results in a flexing of the associated conduits or hoses 58 in the chamber 52. Since the transmission 80 is mounted on the track assembly 24, the motor is maintained in a driving relationship with the transmission 80 and track assembly 24 while the track assembly is being moved relative to the body 18. Of course, a similar relationship exists between the motor 36, track assembly 26 and body 18.

In view of the foregoing it can be seen that a crawler mechanism 10 is provided which has track assemblies 24 and 26 which are movable between outer or extended positions and inner or retracted positions by sliding the track assemblies along axle or inner tubes 122. Spacer assemblies 140 are provided for releasably engaging the inner tubes 122 to hold the track assemblies 24 and 26 in the inner and outer positions. The track assemblies are driven by separate hydraulic motors 24 and 26 through separate transmissions, similar to the transmission 80. The motors 34 and 36 are advantageously mounted on the side walls of the track assemblies for movement relative to the body 18 (see FIGS. 2 and 3). Thus, movement of one of the track assemblies 24 or 26 between the inner and outer positions moves the associated motor 34 or 36 and transmission with the track assembly.

Although a specific embodiment of the invention has been illustrated herein it will be apparent to those skilled in the art that many changes and modifications can be made therein. For example changes in the specific structure of both the drive assembly and the axle assemblies could be made if desired. It is also contemplated that the crawler mechanism 10 will find uses in many environments other than in association with excavating machines.

What is claimed is:

1. A crawler mechanism comprising a frame, a cab assembly rotatably mounted on said frame, first and second spaced apart track means for moving said crawler mechanism relative to a support surface, a plurality of axles operatively interconnecting said first and second track means and said frame, said first and second track means being movable relative to each other and to said axles to enable the spacing therebetween to be varied, first and second hydraulic motor means for driving said first and second track means respectively, said first and second hydraulic motor means being mounted on an associated one of said track means for movement relative to each other with the associated track means when the spacing between said track means is varied, control means on said cab assembly for controlling said first and second hydraulic motor means, and means for interconnecting said control means and said first and second hydraulic motor means, said means interconnecting said control means and said first and second hydraulic motor means including a post assembly having an outer housing fixedly mounted on said frame and an inner portion connected to said cab assembly for rotation therewith relative to said outer housing, first fluid conduit means connecting said control means in fluid communication with passages formed in said post assembly, and second fluid conduit means secured at one end portion to said housing and at another end portion to said first and second hydraulic motor means, said second fluid conduit means being connected in fluid communication with said control means through the passages in said post assembly to thereby tend to minimize flexing of said second fluid conduit means upon rotation of said cab assembly relative to said frame.

2. A crawler mechanism as set forth in claim 1 further including outer stop means mounted on outer end portions of said axles for limiting outward movement of said first and second track means relative to said axles, inner stop means located adjacent to inner portions of said axles for limiting inward movement of said first and second track means relative to said axles, a plurality of spacer means mounted on said axles for positioning said first and second track means relative to said axles, each of said spacer means including first and second sections which extend around an axle and are releasably interconnected to enable said spacer means to be readily moved between an inner position adjacent to said inner stop means and an outer position adjacent to said outer stop means, said first and second track means being spaced a relatively large predetermined distance apart when said spacer means are in said inner positions, said first and second track means being spaced a relatively small predetermined distance apart when said spacer means are in said outer positions.

3. A crawler mechanism as set forth in claim 1 further including first transmission means mounted on said first track means for drivingly connecting said first hydraulic motor means to said first track means, second transmission means mounted on said second track means for drivingly connecting said second motor means to said second hydraulic track means, said first and second transmission means being movable relative to each other with an associated hydraulic motor means and track means when the spacing between said track means is varied, and wherein said first and second transmission means are located within lateral confines of said first and second track means respectively.

4. A crawler mechanism as set forth in claim 1 further including first transmission means for drivingly connecting an output end portion of said first hydraulic motor means to said first track means, and second transmission means for drivingly connecting an output end portion of said second motor means to said second hydraulic track means, said first and second track means each having upper and lower runs of track with an associated transmission means and hydraulic motor means output end portion located between and within lateral confines of said upper and lower runs of track.

5. A crawler mechanism as set forth in claim 1, wherein said first and second hydraulic motor means have output members which extend in a generally transverse relationship with first and second track means, and said first and second transmission means each include gear trains having a plurality of gears mounted for rotation about axes extending generally parallel to said output members of said first and second hydraulic motor means.

6. A crawler mechanism as set forth in claim 5 wherein at least said output members of said first and second hydraulic motor means extend between said upper and lower runs of said track means.

7. A crawler mechanism as set forth in claim 5 wherein said first and second motor means extend transversely through the lateral confines of the associated track means.

8. A crawler mechanism as set forth in claim 7 wherein said first and second track means include generally upright side walls, and said first and second hydraulic motor means and said first and second transmission means are at least partially supported by the side walls of the associated track means.

References Cited

UNITED STATES PATENTS

| | | | |
|---|---|---|---|
| 2,035,858 | 3/1936 | Bauer et al. | 180—9.48 |
| 2,634,008 | 4/1953 | Osgood. | |
| 2,763,330 | 9/1956 | Potter | 180—9.48 |
| 3,036,650 | 5/1962 | Cimino | 180—9.48 X |
| 3,312,291 | 4/1967 | Haug | 180—9.48 X |

FOREIGN PATENTS 306,819  7/1965  Switzerland.

LEO FRIAGLIA, Primary Examiner

J. A. PEKAR, Assistant Examiner

U.S. Cl. X.R.

180—6.58, 9.48

PO-1050
(5/69)

UNITED STATES PATENT OFFICE
CERTIFICATE OF CORRECTION

Patent No. 3,494,439      Dated Feb. 10, 1970

Inventor(s) LESTER H. KLINE

It is certified that error appears in the above-identified patent and that said Letters Patent are hereby corrected as shown below:

Column 6 lines 43 and 44 which read "for drivingly connecting said second motor means to said second hydraulic track means, said first and second trans-" should read --for drivingly connecting said second hydraulic motor means to said second track means, said first and second trans- --

Column 6 line 56 which reads "second motor means to said second hydraulic track means," should read --second hydraulic motor means to said second track means,--

SIGNED AND
SEALED

JUL 14 1970

(SEAL)
Attest:

Edward M. Fletcher, Jr.
Attesting Officer

WILLIAM E. SCHUYLER, JR.
Commissioner of Patents